US010171167B2

United States Patent
Zhang et al.

(10) Patent No.: US 10,171,167 B2
(45) Date of Patent: Jan. 1, 2019

(54) MULTIMEDIA NETWORK DATA PROCESSING SYSTEM

(71) Applicant: Beijing JiShi HuiTong Technology Co., Ltd., Beijing (CN)

(72) Inventors: Xuejun Zhang, Beijing (CN); Getu Zhaoer, Beijing (CN); Shengjie Wang, Beijing (CN); Jie Ouyang, Beijing (CN)

(73) Assignee: Beijing JiShi HuiTong Technology Co., Ltd., Beijing (CN)

(*) Notice: Subject to any disclaimer, the term of this patent is extended or adjusted under 35 U.S.C. 154(b) by 0 days.

(21) Appl. No.: 15/794,702

(22) Filed: Oct. 26, 2017

(65) Prior Publication Data
US 2018/0234187 A1 Aug. 16, 2018

(30) Foreign Application Priority Data

Feb. 10, 2017 (CN) .......................... 2017 1 0073220

(51) Int. Cl.
*H04B 10/2575* (2013.01)
*H04N 21/234* (2011.01)
(Continued)

(52) U.S. Cl.
CPC ... *H04B 10/25751* (2013.01); *H04B 10/2503* (2013.01); *H04L 12/66* (2013.01);
(Continued)

(58) Field of Classification Search
CPC ......... H04N 21/47202; H04N 7/17318; H04N 21/64322; H04N 21/6125; H04L 65/4084;
(Continued)

(56) References Cited

PUBLICATIONS

IEEE P802.3TM D1.802, (Amendment of IEEE Std 802.3-2008), IEEE Computer Society, Draft Amendment to IEEE Std 802.3-2008, IEEE 802.3av 10G-EPON Task Force, Draft Standard for Information technology; Telecommunications and information exchange between systems; Local and metropolitan area networks; Specific requirements; Part 3: Carrier Sense Multiple Access with Collision Detection (CSMA/CD) Access Method and Physical Layer Specifications, New York, Jun. 6, 2008, (205 pages).
(Continued)

*Primary Examiner* — Hsiungfei Peng
(74) *Attorney, Agent, or Firm* — Fish & Richardson P.C.

(57) ABSTRACT

The present disclosure relates to a multimedia network data processing system, comprising: a head-end switch, which transmits multimedia network data of the data that is sent from a server to a terminal device to a head-end network processor, wherein the multimedia network data is multimedia network data based on the TCP/HTTP protocol; a head-end network processor, which encapsulates the multimedia network data to form a UDP packet and sends the UDP packet to a unidirectional broadcasting optical fiber network; and a data processing module, which receives the UDP packet from the unidirectional broadcasting optical fiber network and decapsulates the UDP packet to obtain the multimedia network data based on the TCP/HTTP protocol for the terminal device to play. A video-on-demand service based on the TCP/HTTP protocol can be realized on the basis of the existing network systems in which the unidirectional channel and the bidirectional channel are separated. And the programs transmitted by radios and TVs can be enriched while the requirements for bandwidth of uplink transmission and bandwidth of downlink transmission can be satisfied.

12 Claims, 2 Drawing Sheets

(51) Int. Cl.
  H04N 21/643   (2011.01)
  H04L 12/26    (2006.01)
  H04L 29/06    (2006.01)
  H04L 29/08    (2006.01)
  H04L 12/66    (2006.01)
  H04N 21/4402  (2011.01)
  H04B 10/25    (2013.01)
  H04Q 11/00    (2006.01)

(52) U.S. Cl.
  CPC .............. *H04L 67/02* (2013.01); *H04L 69/16* (2013.01); *H04N 21/234* (2013.01); *H04N 21/440209* (2013.01); *H04N 21/643* (2013.01); *H04Q 11/0003* (2013.01)

(58) Field of Classification Search
  CPC ........... H04L 65/4076; H04L 29/06027; H04L 63/10; H04L 12/18; H04L 65/4069
  See application file for complete search history.

(56) References Cited

PUBLICATIONS

IEEE Std 802.3byTM, IEEE Computer Society, IEEE Standard for Ethernet, IEEE Standards Association, Amendment 2: Media Access Control Parameters, Physical Layers, and Management Parameters for 25 Gb/s Operation,; (Amendment to IEEE Std 802.3™-2015 as amended by IEEE Std 802.3bw™-2015), New York, 2016 (244 pages).

IEEE Std 802.3ae™-2002 (Amendment to IEEE Std 802.3-2002), IEEE Computer Society, 802.3aeTM, IEEE Standard for Information technology; Telecommunications and information exchange between systems; Local and metropolitan area networks; Specific requirements; Part 3: Carrier Sense Multiple Access with Collision Detection (CSMA/CD) Access Method and Physical Layer Specifications; Amendment 1: Media Access Control (MAC) Parameters, Physical Layers, and Management Parameters for 10 Gb/s Operation, New York, Aug. 30, 2002 (529 pages).

IEEE 802.3baTM-2010 (Amendment to IEEE Std 802.3TM-2008) IEEE Computer Society, IEEE Standard for Information Technology; Telecommunications and information exchange between systems; local and metropolitan area networks; specific requirements; Part 3: Carrier Sense Multiple Access with Collision Detection (CSMA/CD) Access Method and Physical Layer Specifications; Amendment 4: Media Access Control Parameters, Physical Layers, and Management Parameters for 40Gb/s and 100 Gb/s Operation, New York, Jun. 22, 2010 (457 pages).

MULTIMEDIA NETWORK DATA PROCESSING SYSTEM

CROSS-REFERENCE TO RELATED APPLICATION

The present application is based upon and claims the benefit of a priority of Chinese Patent Application No. 201710073220.0, filed on Feb. 10, 2017, the entire contents of which are incorporated herein by reference.

TECHNICAL FIELD

The present disclosure relates to the field of communication technology, and more particularly to a multimedia network data processing system.

RELATED ART

Currently the services operated on broadcast television and telecommunication (telecom) networks can be divided into the following two kinds according to the characteristics of uplink/downlink traffic:

(1) symmetric services: for example, voice communications, video communications, etc.; and (2) asymmetric services: for example, live video streaming, video on demand (OTT/VOD), video surveillance, VR (Virtual Reality), games, web page browsing, e-mail, file downloads, etc.

The common characteristic of the above mentioned asymmetric services is that, the downlink requires high bandwidth (1 Mbps to 100 Mbps), while the uplink requires low bandwidth (10 Kbps to 100 Kbps). Among the above mentioned asymmetric services, the video-based and the game-based services have gradually become the main sources of revenue for broadcast television and telecommunication operators. In addition to the above requirements for the bandwidth, these asymmetric services also have requirements for the QoS (bit error, packet loss, time delay, delay jitter, etc.) of network, which would greatly influence service quality and user experience.

There are 2 transmission schemes now widely used by broadcast television and telecommunication networks, namely, EPON (Ethernet Passive Optical Network) which provides fixed uplink and downlink rates of 1.25 Gbps (usually distributed in a ratio of 1:32) and GPON (Gigabit-Capable PON, passive optical access system) which provides an uplink rate of 1.25 G and a downlink rate of 2.5 G (usually distributed in a ratio of 1:64). Neither of them can meet the above asymmetric services' requirement for the ratio of downlink rate to uplink rate, which reaches up to several hundreds.

Network systems based on separated unidirectional and bidirectional channels, such as an I-PON system (based on 10 Gigabit IP broadcast technology and PON technology, see the *White Paper of Cable Television Network Fiber to the Home Technology* issued by the Science and Technology Department of the SARFT, China), can satisfy the requirements of asymmetric services to a certain extent.

However, at present, broadcast television and telecommunication operators widely provide video services based on the OTT (Over The Top). No matter the services are live video streaming or video on demand, the datagram types of the third/fourth/application layers of these services are respectively unicast/TCP/HTTP (HLS). The TCP/HTTP protocol is highly dependent on a bidirectional physical channel, so it cannot be well compatible with a network system based on separated unidirectional and bidirectional channels, and many advantages of the OTT, such as easy and smooth transmission of large volume data and richer program contents, cannot be exploited.

SUMMARY

In view of the above situation, the present disclosure proposes a multimedia network data processing system which realizes a video-on-demand service based on the TCP/HTTP protocol on the basis of a network system in which the unidirectional channel and the bidirectional channel are separated.

According to one aspect of the present disclosure, there is provided a multimedia network data processing system comprising: a head-end switch, which transmits multimedia network data of the data that is sent from a server to a terminal device to a head-end network processor, wherein the multimedia network data is multimedia network data based on the TCP/HTTP protocol; a head-end network processor, which encapsulates the multimedia network data to form a UDP packet and sends the UDP packet to a unidirectional broadcasting optical fiber network; and a data processing module, configured to receive the UDP packet from the unidirectional broadcasting optical fiber network and decapsulates the UDP packet to obtain the multimedia network data based on the TCP/HTTP protocol for the terminal device to play; the unidirectional broadcasting optical fiber network, whose physical layer is based on fiber optic Ethernet protocol, configured to use one or more optical amplifiers and one or more optical splitters for unidirectional broadcasting to transmit IP data stream, the IP data stream comprises at least UDP multicast packets or UDP broadcast packets.

In one possible embodiment, the fiber optic Ethernet protocol is 10G Base-R described in IEEE802.3ae, or, the fiber optic Ethernet protocol is 25G Base-R described in IEEE802.3by, or, the fiber optic Ethernet protocol is 40G Base-R or 100G Base-R described in IEEE802.3ba.

In one possible embodiment, the system further comprises: a gateway, the data processing module being set in the gateway, and the gateway send the decapsulated multimedia network data based on the TCP/HTTP protocol to the terminal device.

In one possible embodiment, the terminal device sends a data request to the server through the gateway via a bidirectional access network based on the TCP/HTTP protocol, to obtain the multimedia network data.

In one possible embodiment, the bidirectional access network for bidirectional data communication and transmission of a data-on-demand request, is an EPON/GPON bidirectional optical fiber network, a coaxial EOC/DOCSIS bidirectional network, a wireless communication network, or Ethernet. In one possible embodiment, the data processing module is set in the terminal device.

In one possible embodiment, the data processing module is a network agent module.

In one possible embodiment, the terminal device sends a data request to the server through the data processing module via a bidirectional network channel based on the TCP/HTTP protocol, to obtain the multimedia network data.

In one possible embodiment, the head-end switch sends data, other than the multimedia network data, of the data that is sent from a server, to a terminal device, via a bidirectional channel to the terminal device, wherein the bidirectional access network is used for bidirectional data communication and transmission of a data-on-demand request, and the bidirectional access network is an EPON/GPON bidirectional optical fiber network, a coaxial EOC/DOCSIS bidirectional network, a wireless communication network, or Ethernet.

In one possible embodiment, the unidirectional broadcasting optical fiber network comprises an optical fiber access network of an 10GE, 40GE, 25GE, 50GE, or 100GE aggregation Ethernet switch, a multi-level optical amplifier, and a multi-level optical splitter, and the optical fiber access network is used for transmitting downlink video data, transmitting IP, TCP, and UDP message data in a format of a link layer and a media-dependent layer of optical fiber Ethernet standard.

In one possible embodiment, the server is a multimedia-on-demand server.

In one possible embodiment, the terminal device is a set-top box.

Aspects can include one or more of the following advantages. The multimedia network data processing system in accordance with the present disclosure realizes separation of the data in a unidirectional channel and the data in a bidirectional channel by a head-end switch, and sends multimedia network data to a head-end network processor; it encapsulates the multimedia network data based on the TCP/HTTP protocol into a UDP packet by the head-end network processor to realize conversion of transmission protocol; the head-end network processor sends the UDP packet through a unidirectional broadcasting optical fiber network; and then it receives and decapsulates the UDP packet to obtain multimedia network data based on the TCP/HTTP protocol by a data processing module, for a terminal device to play. The above system can realize a video-on-demand service based on the TCP/HTTP protocol, such as OTT, etc., on the basis of the existing network systems in which the unidirectional and bidirectional channels are separated, and may greatly enrich the programs transmitted by broadcast television while satisfying the requirements for bandwidth of uplink transmission and bandwidth of downlink transmission.

Other features and aspects of the present disclosure will become clear according to the following detailed description of exemplary examples with reference to the drawings.

BRIEF DESCRIPTION OF THE DRAWINGS

The drawings, which are contained in and constitute a part of the specification, illustrate the exemplary examples, features, and aspects of the present disclosure together with the specification, and are used to explain the principles of the present disclosure.

DETAILED DESCRIPTION

Figure 1:
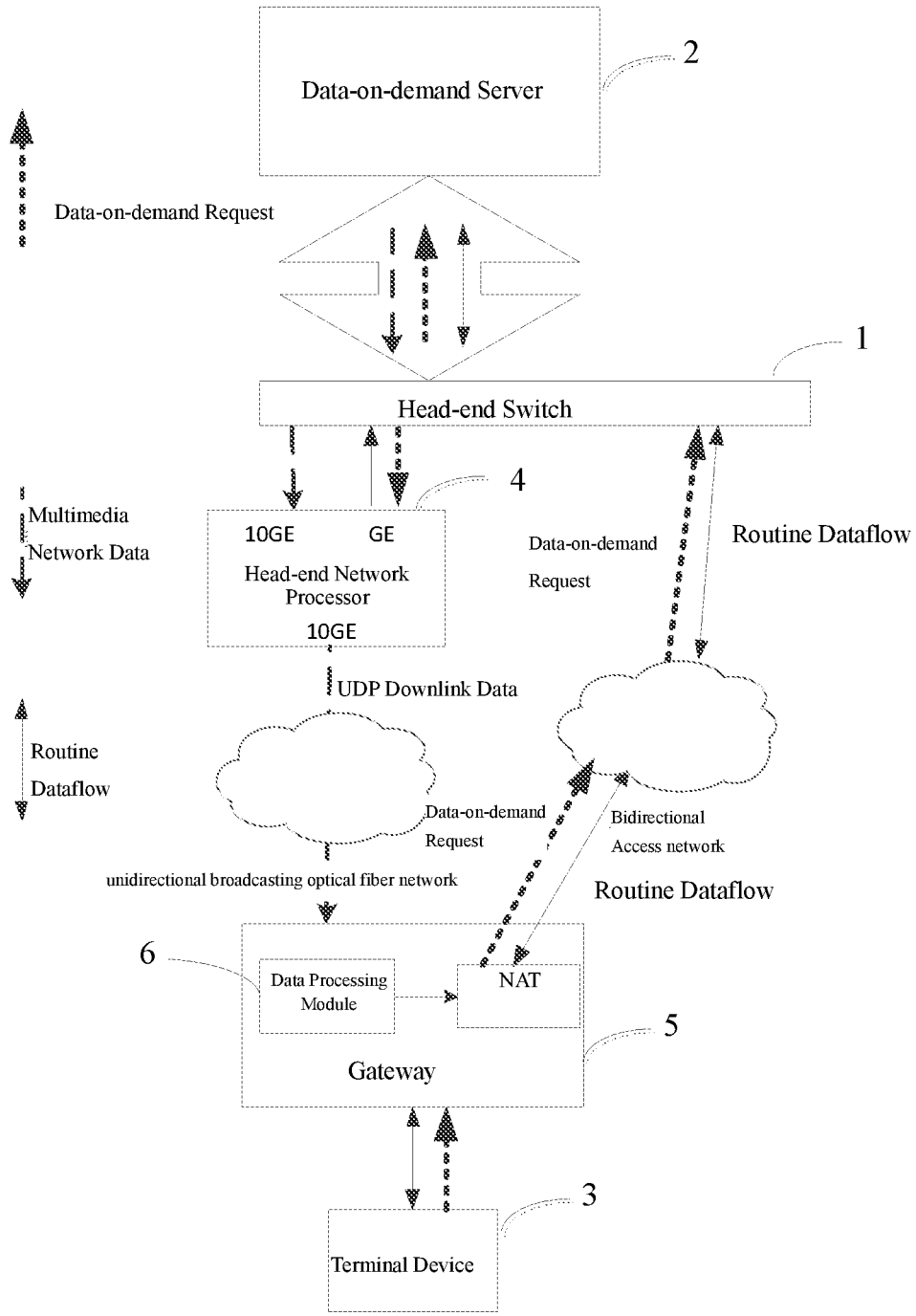
FIG. 1 shows a schematic diagram of a multimedia network data processing system according to an example of the present disclosure.

Each exemplary example, feature, and aspect of the present disclosure will be described in detail below with reference to the drawings. Elements having the same or similar function are indicated by the same reference numeral in the drawings. Although each aspect of the examples is shown in the drawings, the drawings are not necessarily drawn to scale unless otherwise specified.

The term "exemplary" as specifically used herein means "being used as an instance or an example, or being illustrative". Any of the examples described herein as "exemplary" need not be construed as being preferred or better than other examples.

In addition, for the purpose of better illustrating the present disclosure, numerous specific details are set forth in the following embodiments. It should be understood by those skilled in the art that the present disclosure can be implemented without certain specific details. In some examples, the methods, means, elements, and circuits well known to those skilled in the art are not described in detail in order to highlight the gist of the present disclosure.

FIG. 1 shows a schematic diagram of a multimedia network data processing system according to an example of the present disclosure. This system can be applied to multimedia data-on-demand services, the data being audio and/or video for example. As shown in FIG. 1, the system comprises:

a head-end switch 1, which transmits multimedia network data of the data sent from a server 2 to a terminal device 3, to a head-end network processor 4, wherein the multimedia network data is multimedia network data based on the TCP/HTTP protocol;

a head-end network processor 4, which encapsulates the multimedia network data to form a UDP packet and sends the UDP packet to a unidirectional broadcasting optical fiber network; and a data processing module 6, which receives the UDP packet from the unidirectional broadcasting optical fiber network and decapsulates the UDP packet to obtain the multimedia network data based on the TCP/HTTP protocol for the terminal device 3 to play.

the unidirectional broadcasting optical fiber network, whose physical layer is based on the fiber optic Ethernet protocol, configured to use one or more optical amplifiers and one or more optical splitters for unidirectional broadcasting to transmit IP data stream, the IP data stream Ccomprisesontains at least UDP multicast packets or UDP broadcast packets.

In one possible embodiment, the fiber optic Ethernet protocol is 10G Base-R described in IEEE802.3ae, or, the fiber optic Ethernet protocol is 25G Base-R described in IEEE802.3by, or, the fiber optic Ethernet protocol is 40G Base-R or 100G Base-R described in IEEE802.3ba.

In one possible embodiment, the fiber optic Ethernet protocol is based on I-PON, about the I-PON, referring to *Specification for fiber to the home of CATV networks—Part*1 : *General requirement,* which is released by The State Administration of Press, Publication, Radio, Film and Television of China in March 2017.

In one possible embodiment, the unidirectional broadcasting optical fiber network comprises an optical fiber access network of an 10GE, 40GE, 25GE, 50GE, or 100GE aggregation Ethernet switch, a multi-level optical amplifier, and a multi-level optical splitter, and the optical fiber access network is used for transmitting downlink video data, transmitting IP, TCP, and UDP message data in a format of a link layer and a media-dependent layer of optical fiber Ethernet standard.

In one possible embodiment, the server 2 may be a multimedia-on-demand server, which sends data to a terminal device in response to a data request command sent by the terminal device based on the TCP/HTTP protocol; the data sent by the data-on-demand server to the terminal device may be data based on the TCP/HTTP protocol; and the data may include multimedia network data and in addition the routine data, wherein the multimedia network data may be video data, audio data, etc., and the routine data may be control data for establishing a connection or the like.

The head-end switch 1 may be a switch located on the side of the data-on-demand server and may be configured with a routing policy that can direct the routing of the multimedia network data, which is sent from the data-on-demand server to the head-end device 3, to the head-end network processor 4. For example, it can forward the data sent by the data-on-demand server to the head-end network processor 4 or other terminals (OLT, etc.), according to the information including the IP address, the TCP port and so on in the protocol.

In one possible embodiment, the head-end switch 1 transmits the multimedia network data of the data sent by the server to the head-end network processor 4, and sends the data (which may be the flow of the routine data as shown in FIG. 1), other than the multimedia network data, of the data sent from a server to a terminal device via a bidirectional channel to the terminal device 3. The bidirectional channel used herein is not limited. The bidirectional channel may be a bidirectional channel in an I-PON system, or may be a channel of other network system based on separated unidirectional and bidirectional channels.

After receiving the above multimedia network data, the head-end network processor 4 encapsulates the multimedia network data with a UDP header to form a UDP packet, thereby realizing transmission protocol conversion of the application layer. The converted UDP packet is sent in the form of a multicast message via a unidirectional broadcasting optical fiber network. The unidirectional broadcasting optical fiber network used herein is not limited. The optical fiber network may be a unidirectional channel in an I-PON system that supports multicast messages and the UDP protocol, or may be a unidirectional channel in other network system based on separated unidirectional and bidirectional channels.

In one possible embodiment, the head-end network processor 4 encapsulates the multimedia network data to form a UDP packet, which process may be obtaining conversion rules by table look-up according to the contents of the TCP/HTTP message and the final destination address of downlink multimedia network data, and adding a UDP header with an appropriate multicast address and port number to the TCP message to form a UDP packet by encapsulation, and then the head-end network processor 4 may send the UDP packet in the form of a multicast message via a unidirectional broadcasting optical fiber network. The conversion rules may be stored in advance in the form of a table in the head-end network processor 4. When the Ethernet transmits unicast IP messages, the MAC address of the receiver is used as the destination MAC address. However, when multicast packets are transmitted, the destination thereof is no longer a specific receiver, but a group of uncertain members. Thus, if the multicast MAC address is to be used, it is necessary to carry out address translation from unicast IP into multicast IP. The specific translation rules may be determined by adopting the translation methods of related art, and the present disclosure does not place any limitation thereto.

The data processing module 6 performs decapsulation after receiving the UDP packet sent from the unidirectional broadcasting optical fiber network. The decapsulation may be removal of the UDP header which is encapsulated in the previous step. After the decapsulation, the multimedia network data based on the TCP/HTTP protocol is obtained for play by the terminal device 3 which supports the TCP/HTTP protocol.

In one possible embodiment, the data processing module 6 may be implemented by a program module embedded within the terminal device, or a programmable processor designed for processing packets, etc. The present disclosure does not place any limitation thereto.

In one possible embodiment, the terminal device 3 may be a set-top box that plays the multimedia network data through a display device connected thereto, wherein the display device may be a television set, a display, or the like.

In one possible embodiment, as shown in FIG. 1, the system further comprises: a gateway 5, the data processing module 6 may be provided in the gateway 5, and the gateway 5 sends the decapsulated multimedia network data based on the TCP/HTTP protocol to the terminal device 3. After decapsulating the multimedia network data and before sending to the terminal device 3, the gateway 5 can perform IP address translation through the NAT (Network Address Translation) client within the gateway 5. After the NAT translates global IP addresses of the received multimedia network data into local private IP addresses, the multimedia network data is sent to the terminal devices 3 whose addresses are consistent with the private IP addresses.

In one possible embodiment, the terminal device 3 may send a data request to the server 2 through the gateway 5 via a bidirectional network channel based on the TCP/HTTP protocol, to obtain the multimedia network data. As described above, the terminal device 3 may be a set-top box. The set-top box sends a data-on-demand request, and as shown in FIG. 1, the private IP address of the set-top box is translated into a global IP address through the IP address translation performed by the NAT client within the gateway 5, and thus the set-top box accesses the internet based on the TCP/HTTP protocol to request data.

The bidirectional network channel may be a bidirectional access network, wherein the bidirectional access network for bidirectional data communication and transmission of a data-on-demand request, is an EPON/GPON bidirectional optical fiber network, a coaxial EOC/DOCSIS bidirectional network, a wireless communication network, or Ethernet.

The multimedia network data processing system in accordance with the above example of the present disclosure realizes separation of the data for a unidirectional channel and the data for a bidirectional channel by a head-end switch, and sends multimedia network data to a head-end network processor; it encapsulates the multimedia network data based on the TCP/HTTP protocol into a UDP packet by the head-end network processor to realize conversion of transmission protocol; it sends the UDP packet through a unidirectional broadcasting optical fiber network; and then it receives and decapsulates the UDP packet by the data processing module, so that the UDP packet is restored to the multimedia network data based on the TCP/HTTP protocol for a terminal device to play. The above system can realize a video-on-demand service based on the TCP/HTTP protocol, such as OTT, on the basis of the existing network systems in which the unidirectional and the bidirectional channels are separated. The uplink requests data based on the TCP/HTTP protocol, and the downlink transmits the multimedia network data through protocol conversion using the unidirectional broadcasting optical fiber network of the network system. The system may greatly enrich the program contents transmitted by broadcast television while satisfying the requirements for bandwidth of uplink transmission and bandwidth of downlink transmission.

Figure 2:
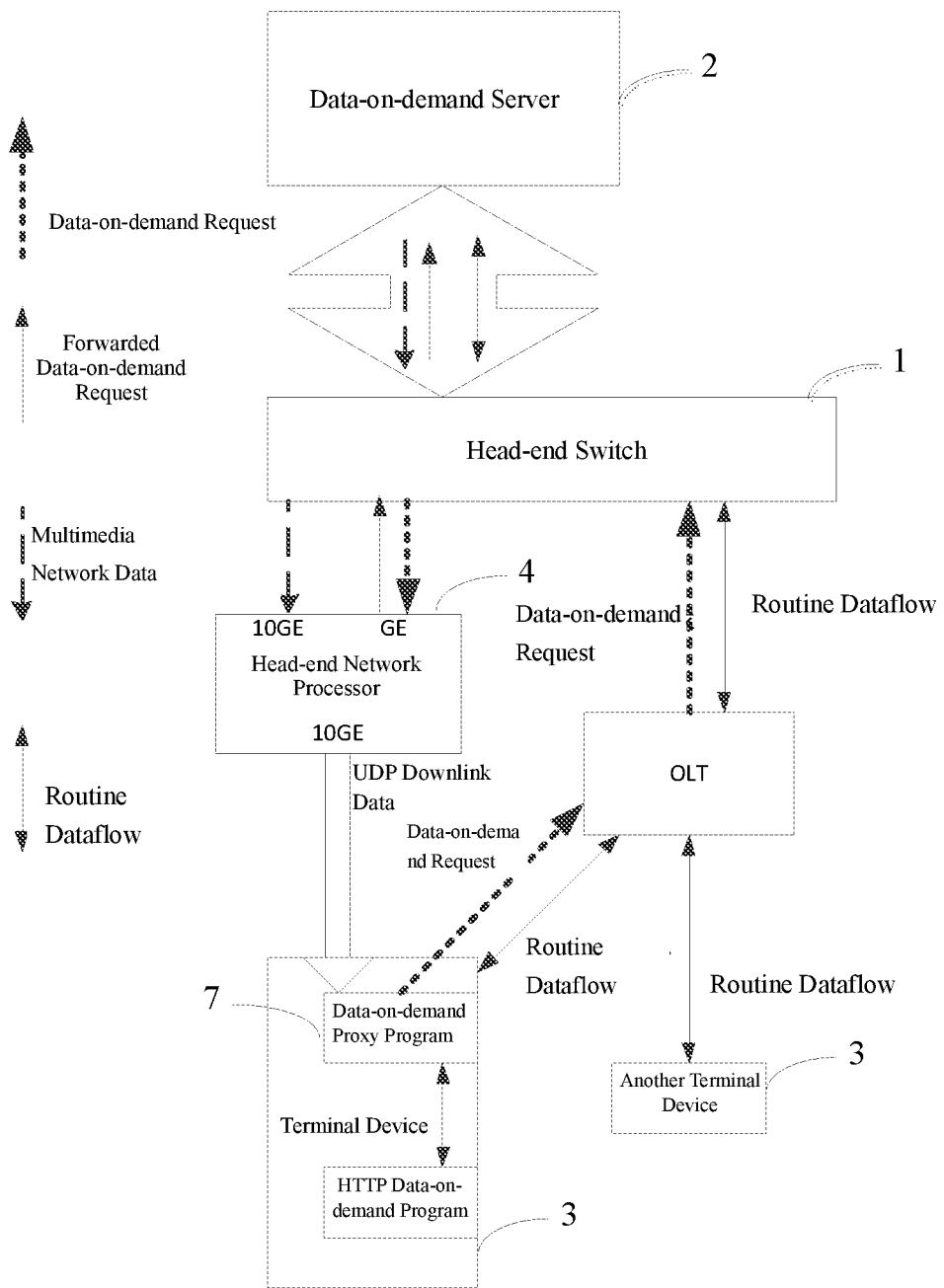
FIG. 2 shows a schematic diagram of a multimedia network data processing system according to another example of the present disclosure.

FIG. 2 shows a schematic diagram of a multimedia network data processing system according to another example of the present disclosure. As shown in FIG. 2, in one possible embodiment, the data processing module 6 may be provided within the terminal device 3; the data processing module 6 may be a network agent module, for example, a data-on-demand agent program 7 as shown in FIG. 2; the terminal device 3 may be a set-top box, and an HTTP data-on-demand program client may be installed within the set-top box.

The set-top box can send a data request based on the TCP/HTTP protocol through the installed HTTP data-on-demand program client, to obtain the multimedia network data. The contents of the request may include authentication information, program selection, video stream link, etc. The following contents describes the processing of the above data request and multimedia network data by the data processing module 6, taking the data-on-demand agent program 7 as an example. After necessary address modification, the data-on-demand agent program 7 sends these requests via a bidirectional network channel to the video-on-demand server. Alternatively, after necessary message encapsulation and address modification, the data-on-demand agent program 7 sends these requests via a bidirectional channel to the head-end switch 1, which forwards the requests to the head-end network processor 4; after receiving the requests, the head-end network processor 4 sends the data-on-demand requests based on the TCP/HTTP protocol to the data-on-demand server after necessary decapsulation and address modification.

In response to the requests, the data-on-demand server sends multimedia network data which may be for example video data. The downlink multimedia network data is sent to the head-end network processor 4 through the head-end switch 1 according to the routing policy pre-configured by the switch. The head-end network processor 4 encapsulates the multimedia network data to form a UDP packet in the same manner as in the example shown in FIG. 1.

The data-on-demand agent program 7 receives the UDP packet sent from the unidirectional broadcasting optical fiber network and decapsulates the same. The decapsulation may be removal of the UDP header which is encapsulated in the previous step, and after the decapsulation, the multimedia network data based on the TCP/HTTP protocol is obtained. The data-on-demand agent program 7 sends the multimedia network data based on the TCP/HTTP protocol to the HTTP data-on-demand program client installed in the terminal device 3. The HTTP data-on-demand program client receives the above-described data and then normally plays the data by a display device connected to the terminal device 3.

In one possible embodiment, the terminal device 3 may be a set-top box that plays the multimedia network data through a display device connected thereto, wherein the display device may be a television set, a display, or the like.

It should be noted that although the multimedia network data processing system is described above by taking video-on-demand data as an example, those skilled in the art can understand that the present disclosure should not be limited thereto. In fact, the user can flexibly set the requested data, which may also be for example audio, animation, pictures, and the like, according to personal preferences and/or actual application scenarios.

The multimedia network data processing system in accordance with the above-described example of the present disclosure can forward the request by a network proxy instead of a gateway, and complete within the terminal device the conversion of the protocol on the receiving end. The above system can realize a video-on-demand service based on the TCP/HTTP protocol such as OTT, on the basis of the existing network systems. The uplink requests data based on the TCP/HTTP protocol, and the downlink transmits the multimedia network data using the unidirectional broadcasting optical fiber network of the broadcasting network system through protocol conversion. The system may greatly enrich the program contents transmitted by radios and TVs while satisfying the requirements for bandwidth of uplink transmission and bandwidth of downlink transmission.

Each example of the present disclosure has been described above, but the foregoing description is exemplary and not exhaustive, and is not limited to each of the disclosed examples. Numerous modifications and variations are apparent to those of ordinary skill in the art without departing from the scope and spirit of each of the illustrated examples. The choice of terminology used herein is intended to explain the idea of each example, the practical application or the improvement to the technology in the market, or enable other persons of ordinary skill in the art to understand each of the examples disclosed herein.

What is claimed is:

1. A multimedia network data processing system, comprising:
   a head-end switch, configured to transmit multimedia network data of the data sent from a server to a terminal device, to a head-end network processor, wherein the multimedia network data is multimedia network data based on the TCP/HTTP protocol;
   the head-end network processor, configured to encapsulate the multimedia network data to form a UDP packet, and send the UDP packet to a unidirectional broadcasting optical fiber network;
   a data processing module, configured to receive the UDP packet from the unidirectional broadcasting optical fiber network, and decapsulate the UDP packet to obtain the multimedia network data based on the TCP/HTTP protocol for the terminal device to play; and
   the unidirectional broadcasting optical fiber network, whose physical layer is based on fiber optic Ethernet protocol, configured to use one or more optical amplifiers and one or more optical splitters for unidirectional broadcasting to transmit IP data stream, the IP data stream comprising at least UDP multicast packets or UDP broadcast packets.

2. The multimedia network data processing system according to claim 1, wherein
   the fiber optic Ethernet protocol is 10G Base-R described in IEEE802.3ae, or
   the fiber optic Ethernet protocol is 25G Base-R described in IEEE802.3by, or
   the fiber optic Ethernet protocol is 40G Base-R or 100G Base-R described in IEEE802.3ba.

3. The multimedia network data processing system according to claim 1, further comprising:
   a gateway, wherein the data processing module is provided in the gateway, and the gateway sends the decapsulated multimedia network data based on the TCP/HTTP protocol to the terminal device.

4. The multimedia network data processing system according to claim 3, wherein the terminal device sends a data request to the server through the gateway via a bidirectional access network based on the TCP/HTTP protocol, to obtain the multimedia network data.

5. The multimedia network data processing system according to claim 4, wherein the bidirectional access network for bidirectional data communication and transmission of a data-on-demand request, is an EPON/GPON bidirectional optical fiber network, a coaxial EOC/DOCSIS bidirectional network, a wireless communication network, or Ethernet.

6. The multimedia network data processing system according to claim 1, wherein the data processing module is provided in the terminal device.

7. The multimedia network data processing system according to claim 6, wherein the data processing module is a network agent module.

8. The multimedia network data processing system according to claim 6, wherein the terminal device sends a data request to the server by the data processing module via a bidirectional access network based on the TCP/HTTP protocol, to obtain the multimedia network data.

9. The multimedia network data processing system according to claim 1, wherein the head-end switch sends data, other than the multimedia network data, of the data sent from the server, to the terminal device via a bidirectional access network, wherein the bidirectional access network is used for bidirectional data communication and transmission of a data-on-demand request, and the bidirectional access network is an EPON/GPON bidirectional optical fiber network, a coaxial EOC/DOCSIS bidirectional network, a wireless communication network, or Ethernet.

10. The multimedia network data processing system according to claim 1, wherein the unidirectional broadcasting optical fiber network comprises an optical fiber access network of an 10GE, 40GE, 25GE, 50GE, or 100GE aggregation Ethernet switch, a multi-level optical amplifier, and a multi-level optical splitter, and the optical fiber access network is used for transmitting downlink video data, transmitting IP, TCP, and UDP message data in a format of a link layer and a media-dependent layer of optical fiber Ethernet standard.

11. The multimedia network data processing system according to claim 1, wherein the server is a multimedia-on-demand server.

12. The multimedia network data processing system according to claim 1, wherein the terminal device is a set-top box.

* * * * *